May 31, 1960 S. RUBEN Re. 24,830

ELECTRIC CURRENT PRODUCING CELL

Original Filed Nov. 2, 1953

INVENTOR.
Samuel Ruben
BY
Nicholas Langer
ATTORNEY

United States Patent Office

Re. 24,830

Reissued May 31, 1960

24,830

ELECTRIC CURRENT PRODUCING CELL

Samuel Ruben, 52 Seacord Road, New Rochelle, N.Y.

Original No. 2,810,006, dated Oct. 15, 1957, Ser. No. 389,756, Nov. 2, 1953. Application for reissue June 27, 1958, Ser. No. 747,323

14 Claims. (Cl. 136—6)

Matter enclosed in heavy brackets [ ] appears in the original patent but forms no part of this reissue specification; matter printed in italics indicates the additions made by reissue.

This invention relates to electric current producing cells and principally to secondary cells and batteries of novel and improved characteristics.

For many years, and particularly for military applications, there has existed a need for a secondary cell or storage battery capable of being stored in the uncharged condition for long periods of time regardless of changes in ambient temperature and other atmospheric conditions without deterioration and which can be charged at any time without special preparation.

I believe that the present invention satisfactorily meets the requirements for a cell of the type described.

The general object of the present invention is the provision of an improved electric current producing cell. A specific object is to provide a secondary cell or battery of new and useful characteristics.

It is another object of the present invention to provide a secondary cell or battery which may be maintained on the shelf in the uncharged condition, with the electrolyte therein, free of local action or deterioration for very long periods of time, and always in condition for charging.

It is also within the objects of the invention to provide a secondary cell of the character described which, upon charging, will provide an efficient and reliable source of electrical energy and which retains those desirable characteristics for a large number of charging and recharging cycles.

The invention also contemplates a secondary cell which is simple in structure, has a high capacity-volume ratio, and which may be readily manufactured on a quantity production scale at a low cost.

Figure 1:
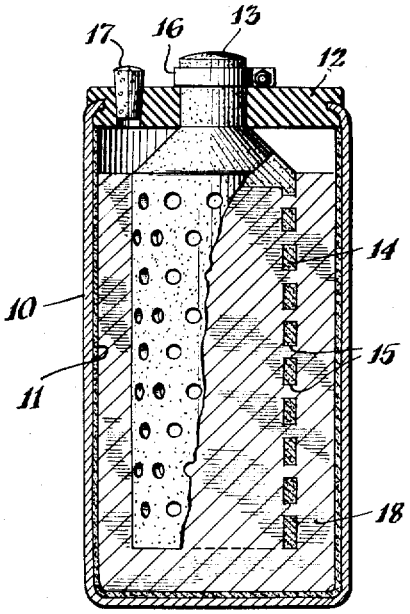
Figure 2:
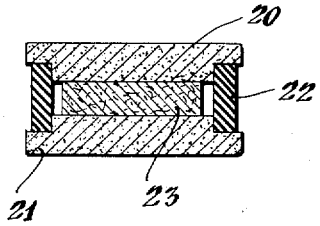

Other and further objects and advantages of the invention will become apparent from the following description, taken in conjunction with the accompanying drawings; in which:

Fig. 1 is a vertical sectional view of a secondary cell embodying the principles of the present invention; and Fig. 2 is a similar view of a modified embodiment of the invention.

The cell of this invention employs an electrolyte consisting preponderantly of a lead salt of exceptionally stable characteristics and which is capable of electrochemically simultaneously depositing lead peroxide on one terminal and lead on the other, and in cooperation with the electrodes, provides a rechargeable cell of the desired characteristics.

I have found that the use of an electrolyte of lead sulfamate, preferably containing sulfamic acid, particularly in combination with inactive electrodes, provides an electric current producing cell of good shelf life and one that will withstand many charge and discharge cycles. While the proportions of lead sulfamate and sulfamic acid may vary, in a preferred form, I utilize an electrolyte consisting of four parts of a 15% aqueous solution of lead sulfamate $Pb(NH_2SO_3)_2$ and one part of a 15% sulfamic acid $HNH_2SO_3$ solution and electrodes of graphite. The voltage of this cell is about 1.6, the exact voltage depending on the percent of free sulfamic acid.

When electrolyzed, lead sulfamate deposits a smooth, dense, low resistance layer of lead peroxide on the anode and a layer of lead on the cathode. Sulfamic acid is also produced at the anode during the charging period. On discharge, the lead and peroxide electrochemically combine with the electrolyte to re-form lead sulfamate.

The lead peroxide formed is electrolytically soluble in the electrolyte and will diffuse into it during discharge, thus differing markedly from the conventional lead sulfuric acid accumulator which forms insoluble lead sulfate on its electrodes. This introduces a desirable factor, namely, that the effective surfaces do not decrease with discharge due to a polarizing insoluble layer as occurs with sulfuric acid cells.

The reactions involved in the operation of the cell can be stated

On charge $$2Pb(NH_2SO_3)_2+2H_2O=Pb+PbO_2+4HNH_2SO_3$$

Discharge $$PbO_2+Pb+4HNH_2SO_3=2Pb(NH_2SO_3)_2+2H_2O$$

I have found that in order to obtain an integral layer of lead peroxide, it is necessary to utilize a conductive surface which, on anodization in the electrolyte, will not form a film or polarizing oxide layer of its own. Graphite, nickel or aluminum possess the desired characteristics and may be employed in various forms, such as, sheet, rod tubes or screens, or the graphite may be applied as a conductive coating, for example, micronized graphite suspended in a silicone resin solution and baked to form a dense conductive water-proof and water-repellant surface. Nickel may be employed in various forms, such as by electroplating on a steel screen, by spraying onto a glass or plastic cloth, etc. Where aluminum is used, one electrode may comprise graphitized aluminum and the other, lead plated aluminum.

The cell described may be sealed against the atmosphere and is particularly useful for military or emergency uses, requiring a device which in the uncharged state has a long life and which, when required for service, can be immediately charged to its rated capacity.

Fig. 1 of the drawing illustrates one form of the invention, in which a free liquid electrolyte is used between the electrodes. The terne plate container 10 is lined with a conductive graphite composition 11, applied to the under surface of the container. In preparing the coating material, micronized graphite is mixed with and suspended in a 5% solution of a silicone varnish, such as Dow Chemical Co. No. 994, the resultant mixture containing about 20% graphite by weight. After the container has been dipped into the mixture or otherwise coated, it is baked at 250° C. for one hour, to form a water-proof, water-repellant and conductive surface which will withstand chemical and electrochemical reaction. The graphite positive electrode 13 having a hollow center 14 extends up through plastic insulator top 12 to which it can be molded. The holes 15 in the wall of electrode 13 permit free circulation of the electrolyte 18, which is admitted to the cell through the hole in top 12, which is thereafter sealed with stopper 17. This stopper consists of a sintered porous ceramic plug which has been wash-impregnated with a 5% solution of the silicone varnish previously described. This treatment provides a water-repellant surface and conditions the plug so as to allow diffusion of any gas which might be generated within the cell, without permitting the passage of any liquid. In the final assembly of the cell, the end of the container 10 is crimped into the plastic top 12 to form a tight seal. Metal strap connector 16, fastened to the electrode 13, provides a convenient positive terminal for the cell. It will be seen that the relatively large graphitized inner surface of the container 10 allows deposition of the lead over a wide area.

Fig. 2 of the drawing illustrates a type of cell which is suitable for series stacking to provide higher voltage. The two silicone treated graphite electrodes 20 and 21 fit tightly into plastic ring separator 22. The space between the electrodes is filled with an absorbent 23, such as Feltril paper which is impregnated with lead sulfamate electrolyte. Alternately, the absorbent may be dispensed with by gelling the electrolyte with a suitable gelling agent, such as cellulose derivatives of the types commonly used in the art for immobilizing electrolyte. The water-repellent surfaces of the electrodes help to avoid creepage and leakage of electrolyte, and yet permit diffusion of gas.

Ordinarily there should be negligible gas generated either on charge or discharge as the operation cycle consists of conversion of lead sulfamate into sulfamic acid with deposition of the electrochemically active cell components, namely, lead peroxide and lead on their respective electrodes and their re-conversion in combination with the sulfamic acid to lead sulfamate.

The elements used are such as to provide a combination which is unusually inert and provides a device of long storageability and of good charge retaining capacity when activated.

If desirable the resistivity of the electrolyte may be somewhat reduced by addition of the more conductive sulfamates, such as sodium or potassium.

For primary cells, conventional dry battery structures may be employed, such as the depolarizer-electrolyte bobbin or layer built types, utilizing the elements described above in place of the zinc, ammonium chloride and manganese dioxide. The primary cell as such, would be somewhat equivalent to the above described secondary cell in the charged state.

I claim:

[1. An electric current producing cell comprising a cathode, an anode, and an electrolyte composed of materials from the group consisting of lead sulfamate and sulfamic acid, the base of said cathode and of said anode being formed of conducting material inert with respect to said electrolyte.]

2. An electric current producing cell comprising a cathode, an anode, and an electrolyte consisting preponderantly of lead sulfamate, the base of said cathode and of said anode being formed of conducting material inert with respect to said electrolyte.

3. An electric current producing cell comprising a pair of electrodes, and an electrolyte comprising lead sulfamate in contact with said electrodes, the base of said electrodes being formed of conducting material inert with respect to said electrolyte.

[4. An electric current producing cell comprising positive and negative electrodes, the base of which comprises materials selected from the group consisting of carbon, nickel and aluminum, and an aqueous electrolyte comprising lead sulfamate in contact with said electrodes.]

5. An electric current producing cell comprising a pair of electrodes, and an electrolyte comprising lead sulfamate and sulfamic acid, the base of said electrodes being formed of conducting material inert with respect to said electrolyte.

[6. An electric current producing cell comprising a container, a pair of electrodes, the surface of at least one of which comprises carbon, and an electrolyte consisting preponderantly of lead sulfamate and containing a smaller percentage of sulfamic acid.]

[7. A rechargeable cell comprising, in combination, a pair of electrodes, and an aqueous electrolyte comprising sulfamic acid in contact with said electrodes, the base of said electrodes being formed of conducting material inert with respect to said electrolyte.]

[8. A rechargeable cell comprising, in combination, positive and negative electrodes of carbon, and an immobilized body of an electrolyte comprising lead sulfamate and sulfamic acid interposed between and in contact with said electrodes.]

[9. A secondary cell comprising, in combination, a pair of carbon electrodes, a layer of porous absorbent material between and in contact with said electrodes, and an aqueous electrolyte comprising lead sulfamate impregnating said layer.]

[10. An electric current producing cell comprising a pair of electrodes at least one of which comprises graphite and silicone, and an electrolyte in contact with said electrode consisting preponderantly of lead sulfamate.]

[11. An electric current producing cell having a positive electrode comprising graphitized aluminum, a negative electrode comprising lead plated aluminum, and an electrolyte comprising lead sulfamate.]

*12. An electric current producing cell comprising a cathode, an anode, and an electrolyte consisting essentially of water and material from the group consisting of lead sulfamate, sulfamic acid and mixtures thereof, the base of said cathode and of said anode being formed of conducting material inert with respect to said electrolyte.*

*13. An electric current producing cell comprising positive and negative electrodes, the base of which comprises materials selected from the group consisting of carbon, nickel and aluminum, and an electrolyte consisting essentially of water and material from the group consisting of lead sulfamate, sulfamic acid and mixtures thereof in contact with said electrodes.*

*14. An electric current producing cell comprising a container, a pair of electrodes, the surface of at least one of which comprises carbon, and an electrolyte consisting essentially of water and material from the group consisting of lead sulfamate and mixtures of lead sulfamate with sulfamic acid.*

*15. A rechargeable cell comprising, in combination, a pair of electrodes, and an electrolyte consisting essentially of water and material from the group consisting of lead sulfamate, sulfamic acid and mixtures thereof in contact with said electrodes, the base of said electrodes being formed of conducting material inert with respect to said electrolyte.*

*16. A rechargeable cell comprising, in combination, positive and negative electrodes of carbon, and an immobilized body of an electrolyte consisting essentially of water and material from the group consisting of lead sulfamate and mixtures of lead sulfamate with sulfamic acid interposed between and in contact with said electrodes.*

*17. A secondary cell comprising, in combination, a pair of carbon electrodes, a layer of porous absorbent material between and in contact with said electrodes, and an electrolyte consisting essentially of water and material from the group consisting of lead sulfamate and mixtures of lead sulfamate with sulfamic acid impregnating said layer.*

*18. An electric current producing cell comprising a pair of electrodes at least one of which comprises graphite and silicone, and an electrolyte in contact with said electrodes consisting essentially of water and material from the group consisting of lead sulfamate and mixtures of lead sulfamate with sulfamic acid.*

*19. An electric current producing cell having a positive electrode comprising graphitized aluminum, a negative electrode comprising lead plated aluminum, and an electrolyte consisting essentially of water and material from the group consisting of lead sulfamate and mixtures of lead sulfamate with sulfamic acid.*

*20. An electric current producing cell comprising a pair of electrodes, one of said electrodes comprising lead and the other of said electrodes comprising lead peroxide, an*

*inert conductive base for said lead peroxide electrode, and an electrolyte consisting essentially of water and material from the group consisting of sulfamic acid and mixtures of sulfamic acid with lead sulfamate.*

*21. An electric current producing cell comprising cooperating electrodes having their operative surfaces respectively composed of lead and lead peroxide, an inert conductive base for said electrode of lead peroxide, and an electrolyte consisting essentially of water and material from the group consisting of sulfamic acid and mixtures of sulfamic acid with lead sulfamate.*

*22. An electric current producing cell in condition ready for the delivery of electric power, which comprises cooperating electrodes of lead and lead peroxide, a base of carbon for said electrode of lead peroxide, and an electrolyte consisting essentially of water and material from the group consisting of sulfamic acid and mixtures of sulfamic acid with lead sulfamate.*

References Cited in the file of this patent or the original patent

UNITED STATES PATENTS

| | | |
|---|---|---|
| 1,911,604 | Calbeck | May 30, 1933 |
| 2,318,592 | Cupery | May 11, 1943 |
| 2,492,206 | White et al. | Dec. 27, 1949 |

OTHER REFERENCES

"The Electrochemical Society," vol. 76, Sept. 14, 1939, pp. 371–380.